(12) United States Patent
Oda et al.

(10) Patent No.: US 11,680,951 B2
(45) Date of Patent: Jun. 20, 2023

(54) SAMPLE ANALYZER AND SAMPLE ANALYZING METHOD

(71) Applicant: SYSMEX CORPORATION, Kobe (JP)

(72) Inventors: Kohei Oda, Kobe (JP); Hironori Katsumi, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 481 days.

(21) Appl. No.: 16/553,905

(22) Filed: Aug. 28, 2019

(65) Prior Publication Data

US 2020/0072860 A1 Mar. 5, 2020

(30) Foreign Application Priority Data

Aug. 31, 2018 (JP) .............................. JP2018-163501

(51) Int. Cl.
*G01N 35/04* (2006.01)
*G01N 35/10* (2006.01)
*G01N 35/00* (2006.01)

(52) U.S. Cl.
CPC ......... *G01N 35/04* (2013.01); *G01N 35/0095* (2013.01); *G01N 35/00732* (2013.01);
(Continued)

(58) Field of Classification Search
CPC .............. G01N 35/04; G01N 35/00732; G01N 35/0095; G01N 35/1004; G01N 35/1079;
(Continued)

(56) References Cited

U.S. PATENT DOCUMENTS

2009/0325274 A1* 12/2009 Hamada ............... G01N 35/026
435/286.2
2012/0045366 A1* 2/2012 Katsumi ............ G01N 35/1011
422/67
(Continued)

FOREIGN PATENT DOCUMENTS

CN 107144699 A * 9/2017
CN 107144699 A 9/2017
(Continued)

OTHER PUBLICATIONS

The Japanese Office Action dated May 26, 2020 in a counterpart Japanese patent application No. 2018-163501.
(Continued)

*Primary Examiner* — Benjamin R Whatley
(74) *Attorney, Agent, or Firm* — Crowell & Moring LLP

(57) ABSTRACT

A sample analyzer includes a suction unit configured to suction a sample in a sample container through a stopper installed in an opening of the sample container; a rack transport unit configured to transport a sample rack holding a sample container along a transport path, and position the sample container held by the sample rack at a suction position by the suction unit; a sample transport unit in which a sample container other than the sample container transported by the rack transport unit is installed and which is configured to transport the installed sample container to the suction position provided on the transport path; a measurement unit configured to measure a sample suctioned by the suction unit from the sample container positioned at the (Continued)

Frist Embodiment suction position; and an analysis unit configured to analyze the sample based on the measurement result of the measurement unit.

20 Claims, 12 Drawing Sheets

(52) U.S. Cl.
CPC ..... *G01N 35/1004* (2013.01); *G01N 35/1079* (2013.01); *G01N 2035/00752* (2013.01); *G01N 2035/00891* (2013.01); *G01N 2035/0413* (2013.01)

(58) Field of Classification Search
CPC .......... G01N 2035/00752; G01N 2035/00891; G01N 2035/0413
See application file for complete search history.

(56) References Cited

U.S. PATENT DOCUMENTS

| | | | |
|---|---|---|---|
| 2012/0141326 A1 | 6/2012 | Kuwano | |
| 2012/0195812 A1* | 8/2012 | Nagai | G01N 35/026 422/562 |
| 2014/0241945 A1* | 8/2014 | Oonuma | G01N 21/51 422/64 |
| 2017/0097370 A1* | 4/2017 | Steinert | G01N 35/026 |
| 2017/0219617 A1* | 8/2017 | Hirami | G01N 35/026 |
| 2017/0343993 A1 | 11/2017 | Vivet et al. | |

FOREIGN PATENT DOCUMENTS

| | | |
|---|---|---|
| EP | 3098605 A2 | 11/2016 |
| EP | 3153864 A1 | 4/2017 |
| EP | 3176587 A1 | 6/2017 |
| JP | H7-229905 A | 8/1995 |
| JP | 2003-083994 A | 3/2003 |
| JP | 2010-107383 A | 5/2010 |
| JP | 2010-243191 A | 10/2010 |
| JP | 2010-276514 A | 12/2010 |
| JP | 2011-179919 A | 9/2011 |
| JP | 5093140 B | 9/2012 |
| JP | 2013-72799 A | 4/2013 |
| JP | 2013-228257 A | 11/2013 |
| JP | 2014-232122 A | 12/2014 |

OTHER PUBLICATIONS

The Japanese Office Action dated Jan. 21, 2020 in a counterpart Japanese patent application No. 2018-163501.
The extended European search report dated Jan. 28, 2020 in a counterpart European patent application No. 19194330.7.
Extended European search report, dated Feb. 28, 2023, pp. 1-6, issued in a European patent application No. 22203812.7, European Patent Office, Munich, Germany.

* cited by examiner

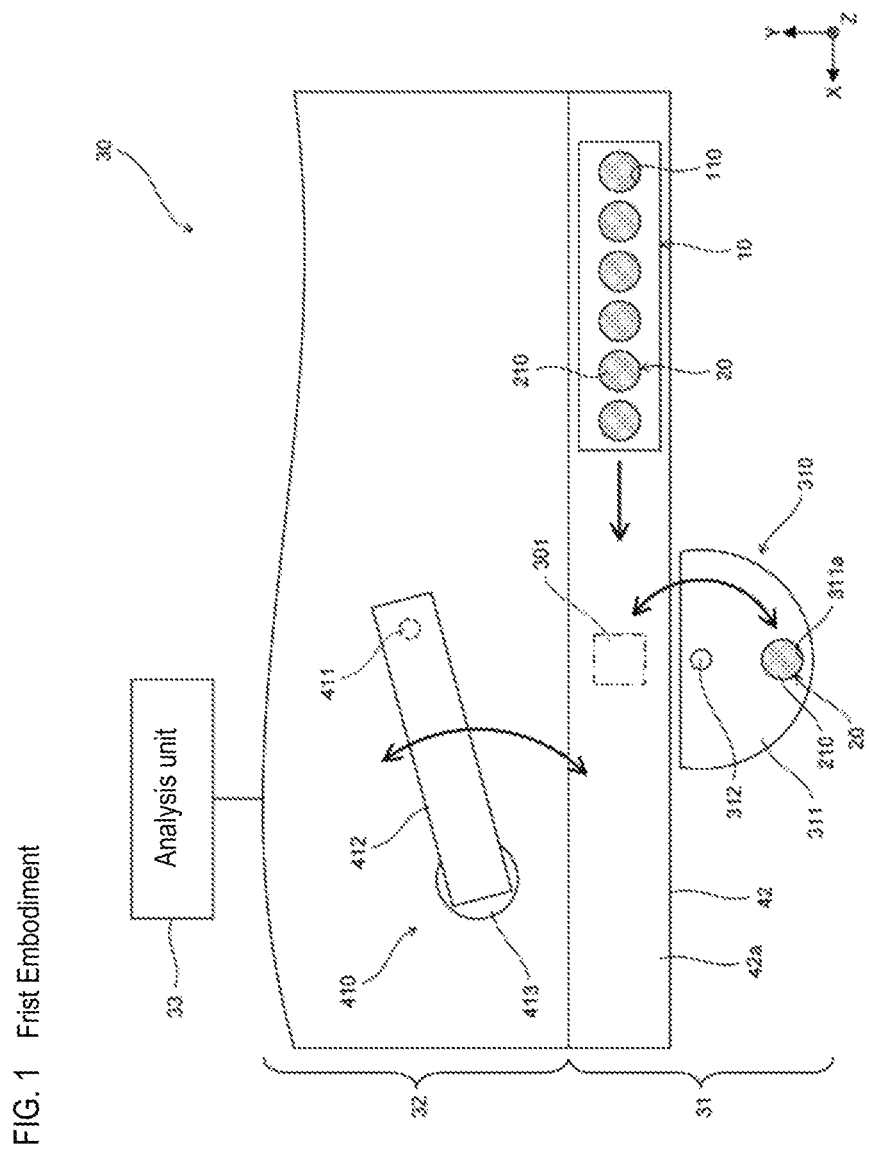
FIG. 1 Frist Embodiment

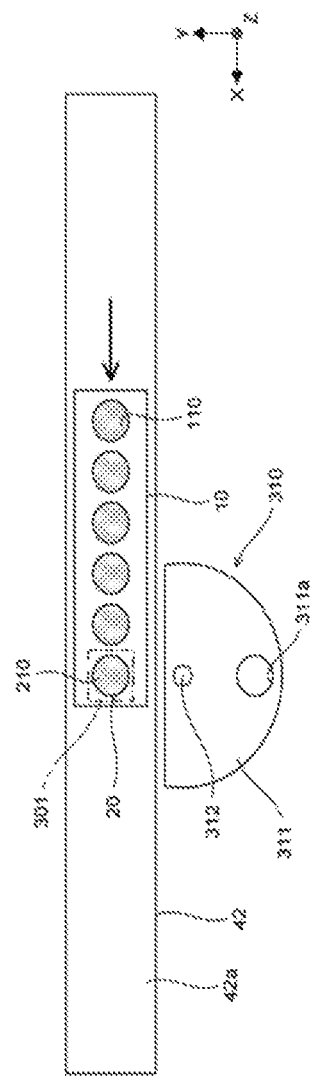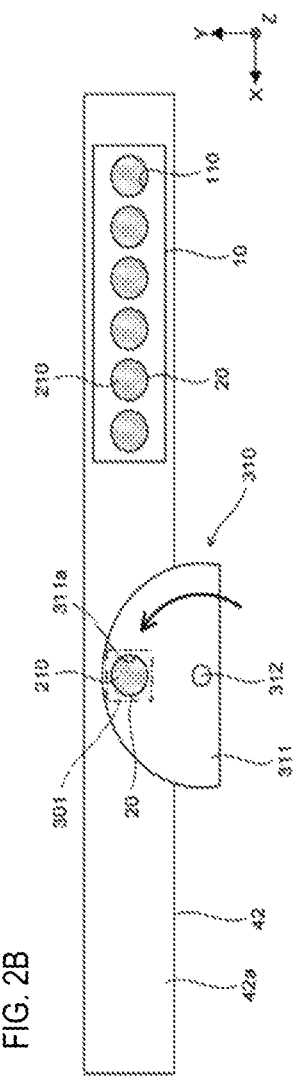

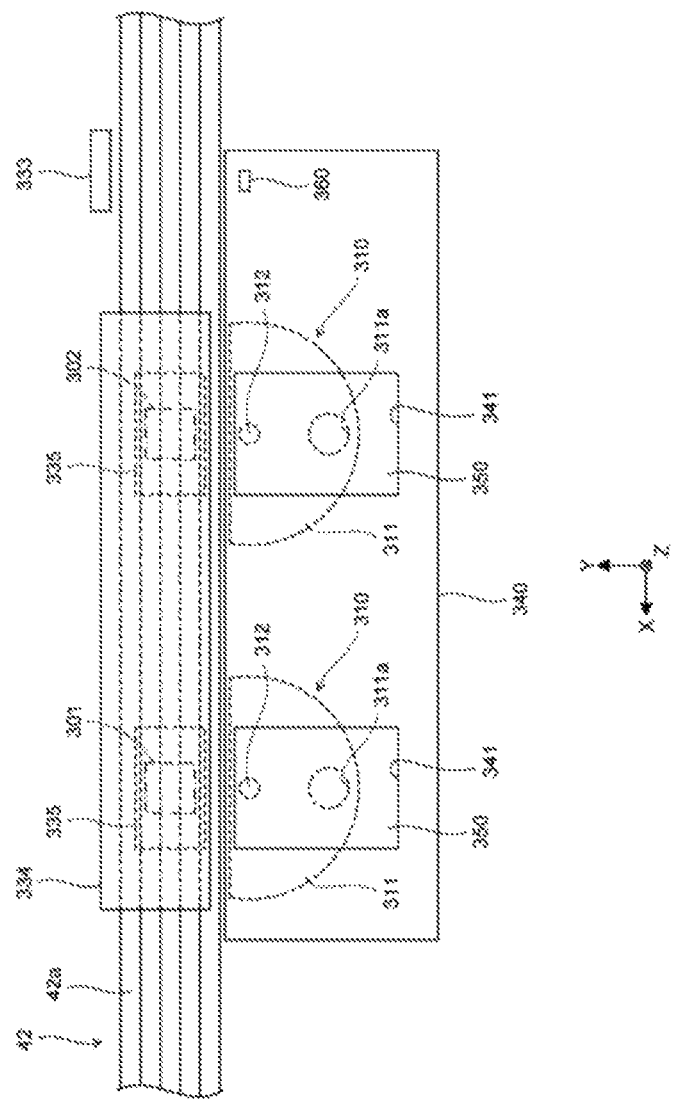
FIG. 10 Second embodiment

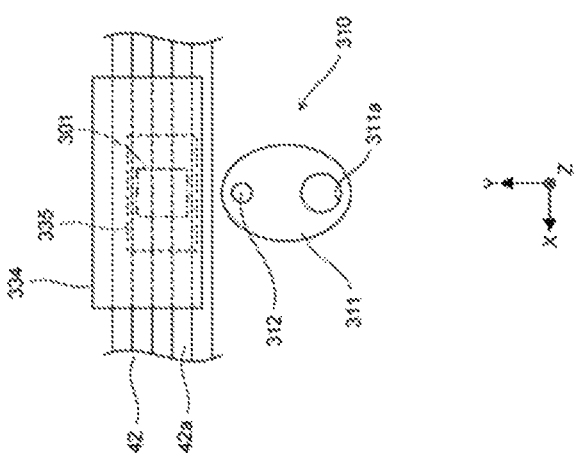
FIG. 11A  Third embodiment
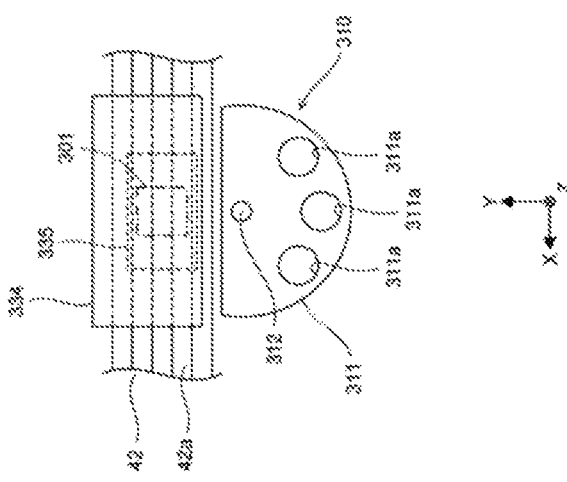
FIG. 11B  Fourth embodiment

SAMPLE ANALYZER AND SAMPLE ANALYZING METHOD

RELATED APPLICATIONS

This application claims priority from prior Japanese Patent Application No. 2018-163501, filed on Aug. 31, 2018, entitled "Sample Analyzer and Sample Analyzing Method", the entire contents of which are incorporated herein by reference.

BACKGROUND OF THE INVENTION

1. Field of the Invention

The present invention relates to a sample analyzer and a sample analyzing method.

2. Description of the Related Art

Japanese Patent Application Publication No. 2011-179919 discloses a sample analyzer that irradiates light on a measurement sample prepared by adding a reagent to a plasma sample, and performs optical measurement of the plasma sample using a coagulation method, a synthetic substrate method, an immunoturbidimetric method, and an aggregation method, and analyzes the results thereof.

As shown in FIG. 12, continuous measurement and urgent measurement are usually performed in this sample analyzer. In the case of normal continuous measurement, a sample rack 510 holding a sample container 520 is transported in the depth direction along a rack setting area 501, and is delivered to the right end of a transport area 502. The sample rack 510 positioned at the right end of the transport area 502 is transported leftward along the transport area 502. When the sample container 520 is positioned at the sample suction position 531, the sample stored in the sample container 520 is suctioned by a sample dispensing unit 541. On the other hand, in the case of urgent measurement, a sample container 520 for performing urgent measurement is set in a sample holder 552 positioned at the right end position of a transport path 551. Then, the sample holder 552 is transported in the leftward direction. When the sample container 520 held by the sample holder 552 is positioned at a suction position 553, the sample stored in the sample container 520 is suctioned by the sample dispensing unit 541.

SUMMARY OF THE INVENTION

In the above-described sample analyzer, two paths are provided for transporting a sample container to suction a sample. In such a sample analyzer, it is preferable to have a suction unit penetrate the stopper installed in the opening of the sample container to suction the sample from within the sample container by a simpler configuration regardless of the route through which the sample container is transported.

A first aspect of the present invention relates to a sample analyzer. The sample analyzer (30) according to the present aspect includes a suction unit (411) for suctioning a sample in a sample container (20) through a stopper (210) installed in the opening (221) of the sample container (20); a rack transport unit (42) configured to transport a sample rack (10) holding a sample container (20) along a transport path (42a), and position the sample container (20) held by the sample rack (10) at a suction position (301) by the suction unit 411; a sample transport unit (310) for installing a sample container (20) other than the sample container (20) transported by the rack transport unit (42), and to transport the installed sample container (20) to the suction position (301) provided on the transport path (42a); a measurement unit (32) configured to measure a sample suctioned by the suction unit (411) from the sample container (20) positioned at the suction position (301); and an analysis unit (33) configured to analyze the sample based on the measurement result of the measurement unit (32).

According to the sample analyzer of the present aspect, both the sample container transported by the rack transport unit and the sample container transported by the sample transport unit, that is, the sample containers transported respectively by the two paths, are positioned at the same suction position. Then, the sample is suctioned using a common suction unit which can penetrate the stopper at the suction position. In this way, according to the sample analyzer of the present aspect, even if the sample container is transported by either of the two paths, the suction unit can penetrate the stopper installed in the opening of the sample container and the sample can be suctioned from within the sample container with a simple configuration.

The sample analyzer (30) according to this aspect may be configured to include a pressing member (334) provided above the sample container (20) positioned at the suction position (301). In this way the sample container can be prevented from moving upward as the suction unit moves, and being pulled out from the sample rack or the sample transport unit when the suction unit that has penetrated the stopper is pulled out of the sample container.

In this case, the sample analyzer (30) according to this aspect may be configured to include a cleaning unit (335) provided on the pressing member (334) to clean the outer surface of the suction unit (411). In this way contamination of a sample can be prevented since the sample attached to the outer surface of the suction unit can be removed.

In the sample analyzer (30) according to this aspect, the sample transport unit (310) is configured to have a holding member (311) for holding the sample container (20), and a rotation drive unit (313) for rotating the holding member (311) in a horizontal direction to transport the sample container to the suction position. In this way the sample transport unit can smoothly transport the sample container installed in the sample transport unit from outside of the transport path to the suction position in the transport path.

In this case, the sample transport unit (310) comprises a rotation shaft (312) configured to rotate the holding member (311), and the holding member (311) may be formed on an opposite side of the rotation shaft (312) relative to the transport path. In this way it is possible to smoothly switch between a state in which the holding member is in the suction position and a state in which the holding member is not in the suction position according to the rotational position of the holding member.

In the sample analyzer (30) according to the present aspect, the shape of the holding member (311) in plan view may be configured to include an arc centered on the rotation shaft (312). In this way the flat area required for the rotation of the holding member can be reduced.

In the sample analyzer (30) according to this aspect, the holding member (311) may be formed with a plurality of container holding parts (311a) for holding the sample container (20). In this way the operator can continuously analyze the plurality of samples through the sample transport unit by setting the plurality of sample containers in the container holding part.

In the sample analyzer (30) according to this aspect, the sample transport unit (310) is configured to include a detection unit (314) that detects that the sample container (20) is held by the holding member (311).

In this case, the sample transport unit (310) is configured to transport the sample container (20) which is held by the holding member (311) to the suction position (301) based on the detection that the sample container (20) is held by the holding member (311). In this way analysis of the sample via the sample transport unit can be smoothly started by setting the sample container in the holding member.

The sample analyzer (30) according to this aspect may be configured to include a cover (350) that covers the sample transport unit (310). In this way it is possible to prevent the operator from inadvertently touching the sample transport unit in operation.

In this case, the sample analyzer (30) according to this aspect may be configured to include a lock mechanism (370) that locks the cover (350). In this way it is possible to prevent the operator from accidentally opening the cover and touching the sample transport unit in operation.

In the sample analyzer (30) according to this aspect, the cover (350) may be configured to include a transparent member (351) which allows the operator to see the position of the sample container (20) installed in the sample transport unit (310). In this way the operator can visually determine whether the sample container is installed in the sample transport unit.

The sample analyzer (30) according to this aspect may be configured to include a notification unit (360) to notify that the sample transport unit (310) is in operation. The notification unit is, for example, an indicator or a liquid crystal panel. In this way the operator can determine whether the sample transport unit is operating by referring to the notification unit.

In the sample analyzer (30) according to the present aspect, the suction unit (411) may be a nozzle with a pointed tip (411a). In this way the suction unit can be easily penetrate through the stopper of the sample container.

In the sample analyzer (30) according to this aspect, the rack transport unit (42) is configured to transport the sample rack (10) holding the sample container (20) containing a normal sample along the transport path (42a), position the sample container (20) held in the sample rack (10) at the suction position (301) and the sample transport unit (10) is configured to transport a priority sample container (20) to the suction position (301) when a sample container containing a priority sample that requires analysis prior to normal sample (20) is installed in the sample transport unit (310).

When analyzing a priority sample, the sample analyzer (30) according to the present aspect is configured to transport the priority sample to the suction position (301) after retracting the sample rack (10) positioned at the suction position (301) from the suction position (301) by the rack transport unit (42). In this way priority sample suction can be performed prior to normal sample suction.

The sample analyzer (30) according to the present aspect may be configured to include a reading unit (333) that reads sample information from the sample container (20) positioned at the suction position (301). In this way one reading unit can read sample information from each sample container positioned at the suction position through different paths.

A second aspect of the present invention relates to a sample analyzing method. The method includes if a sample container containing a priority sample is installed in a sample analyzer when a sample container containing a normal sample has been transported along a transport path to a suction position by a suction unit, retracting the sample container containing the normal sample from the suction position and transporting the installed sample container containing the priority sample to the suction position; penetrating a stopper installed in an opening of the sample container positioned at the suction position by the suction unit to suction the priority sample in the sample container positioned at the suction position; measuring the priority sample suctioned from the sample container positioned at the suction position; and analyzing the priority sample based on a measurement result of the priority sample.

According to the sample analysis method of this aspect, the same effect as that of the first aspect is achieved. The priority sample also can be suctioned prior to the suction of the normal sample.

A third aspect of the present invention relates to a sample analyzer. The sample analyzer includes a suction unit configured to suction a sample in a sample container; a rack transport unit configured to transport a sample rack holding a sample container along a transport path, and position the sample container held by the sample rack at a suction position by the suction unit; a sample transport unit comprising a holding member configured to hold a sample container other than the sample container transported by the rack transport unit, and a rotation drive unit configured to rotate the holding member in a horizontal direction to transport the sample container held by the holding member to the suction position; a measurement unit configured to measure a sample suctioned by the suction unit from the sample container positioned at the suction position; and an analysis unit configured to analyze the sample based on the measurement result of the measurement unit, wherein a transport route of the sample container by the rack transport unit and a transport route of the sample container by a rotational operation of the rotation drive unit intersect at the suction position, and the holding member is arranged to hold the sample container at a position away from the transport path, and the rotation drive unit transports the sample container held by the holding member to the suction position from the position away from the transport path.

According to the sample analyzer of the this aspect, the sample container is positioned at the same suction position by two different transport paths and the sample is suctioned using the shared suction unit at the same suction position while suppressing the complication of the analyzer. Therefore, even when a suction unit that can penetrate the stopper of the sample container is used as the shared suction unit, it is possible to prevent the analyzer from becoming complicated.

According to the present invention, regardless of which of the two paths the sample container is transported, the suction unit is caused to penetrate the stopper attached to the opening of the sample container, and the sample is suctioned from the sample container by a simple configuration.

BRIEF DESCRIPTION OF THE DRAWINGS

FIG. 1 schematically shows an outline of the structure of a sample analyzer according to a first embodiment; FIG. 1 is a plan view of the transport unit and the measurement unit according to the first embodiment when viewed in the Z-axis positive direction;

FIG. 2A is a schematic view showing the position of the sample rack and the position of the holding member of the sample transport unit when a normal sample is suctioned from the sample container held in the sample rack according to the first embodiment; FIG. 2B is a schematic view showing the position of the sample rack and the position of the holding member of the sample transport unit when a priority sample is suctioned from the sample container held by the sample transport unit according to the first embodiment;

FIG. 10 is a plan view of the transport unit in the vicinity of the suction position according to a second embodiment as viewed in the Z-axis positive direction;

FIG. 11A is a plan view of the transport unit in the vicinity of the suction position according to a third embodiment as viewed in the Z-axis positive direction; FIG. 11B is a plan view of the transport unit in the vicinity of the suction position according to a fourth embodiment as viewed in the Z-axis positive direction.

DETAILED DESCRIPTION OF THE PREFERRED EMBODIMENTS

First Embodiment

Figure 3B:
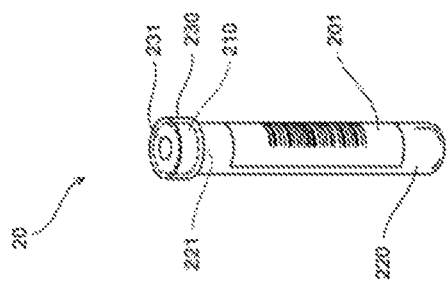
FIG. 3B is a perspective view showing the configuration of the sample container according to the first embodiment.

As shown in FIG. 1, the sample analyzer 30 includes a transport unit 31 and a measurement unit 32. The transport unit 31 transports the sample container 20 held by the sample rack 10 by transporting the sample rack 10 to the suction position 301 where the measurement unit 32 suctions the sample. The transport unit 31 transports the sample container 20 held by the holding member 311 of the sample transport unit 310 to the suction position 301 by driving the sample transport unit 310. The entire structure of the transport unit 31 will be described later with reference to FIG. 4. The structures of the sample analyzer 30 and the measurement unit 32 will be described later with reference to FIGS. 7 to 9.

In FIG. 1, the XYZ axes are orthogonal to each other, and the X-axis direction and the Y-axis direction correspond to directions parallel to the horizontal plane. The positive direction of the X-axis corresponds to the left direction, the positive direction of the Y-axis corresponds to the backward direction, and the positive direction of the Z-axis corresponds to the vertically downward direction. Note that in the other drawings, the XYZ axes are set the same as in FIG. 1.

As shown in FIG. 1, the transport unit 31 includes a rack transport unit 42 and a sample transport unit 310.

The rack transport unit 42 transports the sample rack 10 sent to the end on the X-axis negative side of the rack transport unit 42 in the X-axis direction along the transport path 42a, and the sample container 20 held by the sample rack 10 is positioned at the suction position 301. The sample rack 10 includes a plurality of container holding parts 110. The container holding part 110 is a hole formed downward from the upper surface of the sample rack 10. The sample container 20 contains a sample therein, and the upper end of the sample container 20 is sealed by a stopper 210. The operator causes the sample rack 10 to hold the sample container 20 containing a normal sample that does not need to be preferentially analyzed, and sets the sample rack 10 in the transport unit 31. Then, the operator starts measurement and analysis of the sample in the sample container 20 held in the sample rack 10. Hereinafter, normal samples which do not need to be analyzed preferentially will be referred to as "normal samples".

The sample transport unit 310 includes a holding member 311 and a rotating shaft 312. The holding member 311 rotates around a rotation axis 312 extending in the Z-axis direction. The holding member 311 includes one container holding part 311a. The container holding part 311a is a hole which can hold the sample container 20 in the state of standing upright in the Z-axis direction. The sample transport unit 310 positions the sample container 20 held by the container holding part 311a at the suction position 301 by rotating the holding member 311 around the rotation shaft 312. The operator causes the holding member 311 to hold the sample container 20 containing the sample requiring analysis in priority to the normal sample, and starts measurement and analysis of the sample in the sample container 20 held by the holding member 311. Hereinafter, a sample requiring analysis in preference to a normal sample is referred to as a "priority sample". Priority samples include those that need to be analyzed urgently.

In this way the sample container 20 containing the priority sample is installed in the sample transport unit 310, and the sample transport unit 310 transfers the installed sample container 20 to the suction position 301. In other words, the sample transport unit 310 receives the sample container 20 different from the sample container 20 transported by the rack transport unit 42, and transports the received sample container 20 to the suction position 301.

The measurement unit 32 includes a sample dispensing unit 410. The sample dispensing unit 410 includes a suction unit 411, an arm 412, and a mechanical unit 413. The suction unit 411 is installed at the tip of the arm 412. The suction unit 411 is configured by a nozzle. The tip of the suction unit 411 is pointed so as to be able to penetrate the stopper 210 of the sample container 20. The mechanical unit 413 is configured to rotate the arm 412 in the circumferential direction and move the arm 412 in the vertical direction. In this way the suction unit 411 can move in the circumferential direction and in the vertical direction. The sample dispensing unit 410 is lowered from above and penetrates the stopper 210 of the sample container 20 positioned at the suction position 301. Then, the sample dispensing unit 410 suctions the sample from the sample container 20 via the suction unit 411.

The measurement unit 32 measures the sample suctioned by the suction unit 411 from the sample container 20 positioned at the suction position 301, and transmits the measurement result of the sample to the analysis unit 33. The analysis unit 33 analyzes the sample based on the measurement result of the measurement unit 32.

As shown in FIG. 2A, the rack transport unit 42 transports the sample container 20 held in the sample rack 10, that is, the sample container 20 containing a normal sample, along the transport path 42a, and positions the sample container 20 at the suction position 301 of the suction unit 411. Then, the suction unit 411 is lowered from directly above the sample container 20 positioned at the suction position 301 and penetrates the stopper 210 and suctions the normal sample from within the sample container 20. On the other hand, as shown in FIG. 2B, the sample transport unit 310 rotates the sample container 20 held by the holding member 311, that is, the sample container 20 containing the priority sample, around the rotation shaft 312 via the holding member 311, and positions the sample container 20 at the suction position 301. Then, the suction unit 411 is lowered from directly above the sample container 20 positioned at the suction position 301 and penetrates the stopper 210 and suctions the priority sample from the inside of the sample container 20.

As described above, both the sample container 20 transported by the rack transport unit 42 and the sample container 20 transported by the sample transport unit 310, that is, the sample containers 20 transported by two paths, are positioned at the same suction position 301. Then, the sample is suctioned using the common suction unit 411 capable of penetrating the stopper 210 at the suction position 301. As described above, according to the first embodiment, the suction unit 411 penetrates the stopper 210 installed in the opening of the sample container 20 and suctions the sample from within the sample container 20 via a simple structure, regardless of which of the two paths the sample container 20 is transported. More specifically, the suction unit 411 penetrates the stopper 210, the normal sample can be suctioned from the inside of the sample container 20 containing the normal sample transported by the rack transport unit 42 and the priority sample can be suctioned from within the sample container 20 containing the priority sample transported by the transport unit 310.

The holding member 311 is formed on one side of the rotation shaft 312, that is, on the Y-axis negative side of the rotation shaft 312 in the state shown in FIG. 1. In this way it is possible to smoothly switch between the state in which the holding member 311 is at the suction position 301 as shown in FIG. 2A and the state in which the holding member 311 is not at the suction position 301 as shown in FIG. 2B according to the rotation position of the holding member 311.

The holding member 311 has a circular arc shape wherein the arc is aligned with a circle centered on the rotation shaft 312 in plan view. In other words, the shape in plan view of the holding member 311 includes an arc centered on the rotation shaft 312. In this way the planar area required for the rotation of the holding member 311 can be reduced in plan view.

The suction unit 411 is a nozzle with a pointed tip. In this way the suction unit 411 can easily penetrate the stopper 210 of the sample container 20.

Next, detailed configurations of the sample rack 10, the sample container 20, and the transport unit 31 will be described with reference to FIG. 3A to FIG. 5B.

Figure 3A:
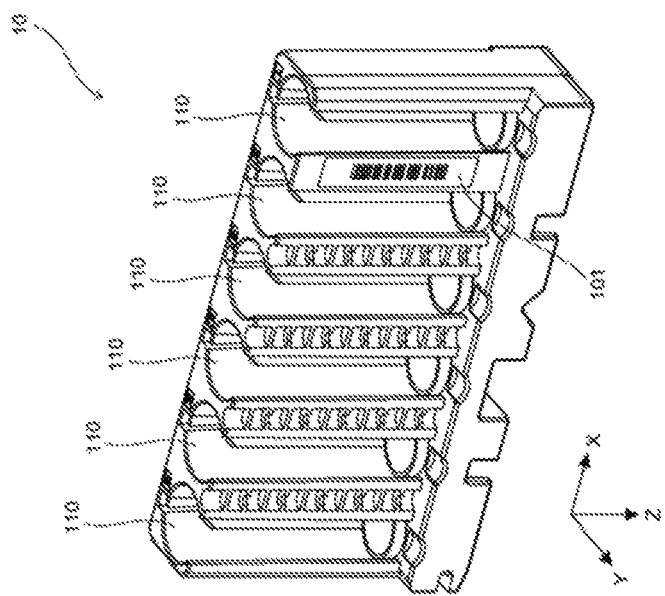
FIG. 3A is a perspective view showing the configuration of a sample rack according to the first embodiment.

As shown in FIG. 3A, the outer shape of the sample rack 10 is a substantially rectangular parallelepiped, and the width in the X-axis direction is longer than the width in the Y-axis direction. The container holding unit 110 holds the sample container 20 in an upright state in the Z-axis direction. When the sample rack 10 includes a plurality of container holding units 110, a plurality of samples can be transported to the measurement unit 32 by transporting of a single sample rack 10. Note that the number of container holders 110 formed in the sample rack 10 is not limited to six, and may be another number.

The identification member 101 is attached to the Y-axis positive side of the sample rack 10. The identification member 101 is a barcode label on which a barcode indicating rack information is printed. The rack information is information that can individually identify the sample rack 10.

As shown in FIG. 3B, the sample container 20 includes an identification member 201, a stopper 210, a body 220, and a lid 230. The body 220 is a blood collection tube made of translucent glass or synthetic resin, and accommodates a sample therein. An opening 221 is formed at the upper end of the body 220. The stopper 210 is made of an elastic synthetic resin or the like. The stopper 210 seals the opening 221 at the upper end of the trunk 220 containing the sample. The lid 230 is made of plastic and covers the stopper 210 attached to the body 220 from the upper side. A hole 231 penetrating vertically is formed at the center of the lid 230. The suction unit 411 of the measurement unit 32 penetrates the stopper 210 in the Z-axis direction via the hole 231.

The identification member 201 is attached to the side surface of the body 220. The identification member 201 is a barcode label on which a barcode indicating sample information is printed. The sample information is information that can individually identify the sample.

Figure 4:
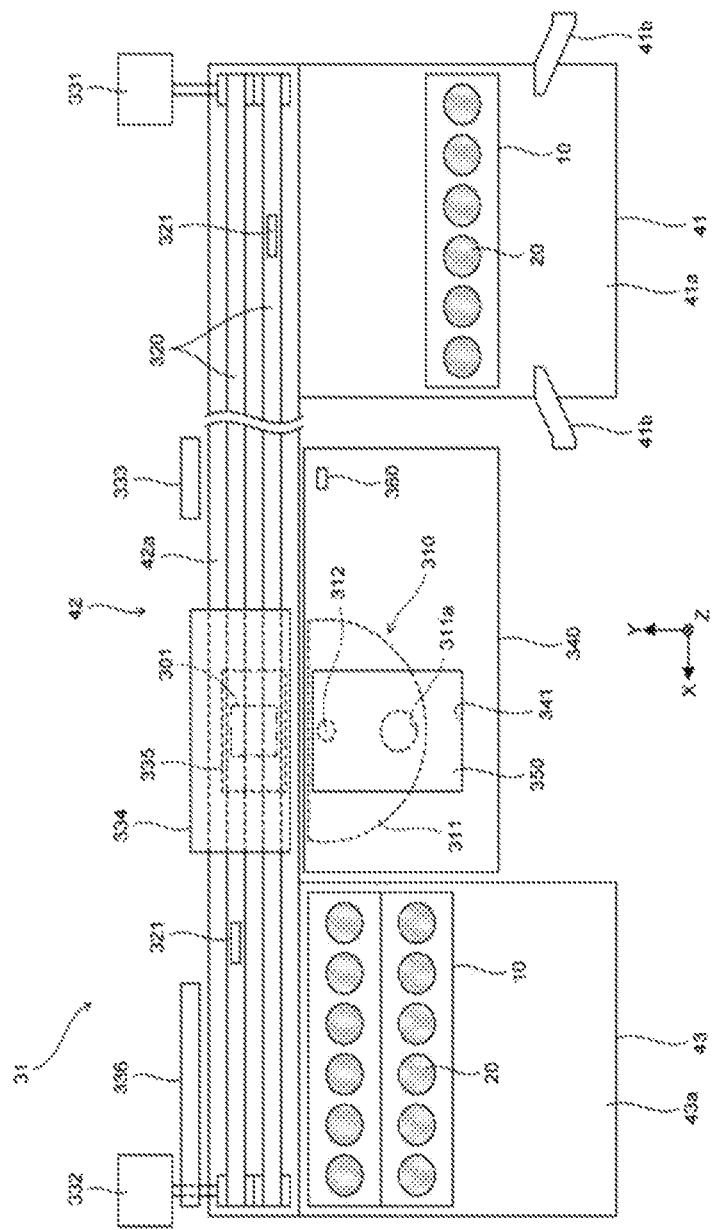
FIG. 4 is a plan view schematically showing the configuration of a transport unit according to the first embodiment.

As shown in FIG. 4, the transport unit 31 includes a rack storage unit 41, a rack transport unit 42, a rack collection unit 43, a sample transport unit 310, a shield member 340, a cover 350, and a notification unit 360.

The sample rack 10 is set in the rack storage unit 41. The sample rack 10 set in the rack storage unit 41 is supported by the bottom surface 41a of the rack storage unit 41. The feed member 41b of the rack storage unit 41 is a claw-shaped member provided at the end on the X-axis positive side and the end on the X-axis negative side of the rack storage unit 41. The feed member 41b is movable in the Y-axis direction. The feed member 41b pushes the side surface on the Y-axis negative side of the sample rack 10 in the Y-axis positive direction, whereby the sample rack 10 set in the rack storage unit 41 is transported from the rack storage unit 41 to the transport path 42a of the rack transport unit 42.

The rack transport unit 42 includes two belts 320, motors 331 and 332, a reading unit 333, a pressing member 334, a cleaning unit 335, and a pushing member 336. The transport path 42a of the rack transport unit 42 is configured by the upper surfaces of the two belts 320.

The two belts 320 extend in the X-axis direction in parallel with each other, and are connected to the pulleys at the ends on the X-axis positive side and the X-axis negative side. The motor 331 rotates a pulley to which the belt 320 on the Y-axis positive side is connected to drive the belt 320 on the Y-axis positive side. The motor 332 rotates a pulley to which the belt 320 on the Y-axis negative side is connected to drive the belt 320 on the Y-axis negative side. Each of the two belts 320 includes one protrusion 321 protruding in the Z-axis negative direction. The sample rack 10 is transported in the X-axis direction in the transport path 42a by driving the belt 320 in a state in which the protrusion 321 is engaged with the notch provided on the lower surface of the sample rack 10.

The reading unit 333 is a bar code reader. The reading unit 333 reads the barcode from the identification member 101 of the sample rack 10 transported by the rack transport unit 42 and the identification member 201 of the sample container 20 held by the sample rack 10. The reading unit 333 is supported movably in the X-axis direction and moves in the X-axis direction on the Y-axis positive side of the transport path 42a by a drive unit (not shown), and reads the barcode from the identification members 101 and 201. The reading unit 333 moves to the Y-axis positive side of the suction position 301 and reads the barcode from the identification member 201 of the sample container 20 positioned at the suction position 301.

As described above, the reading unit 333 reads the sample information by reading the barcode from the sample container 20 positioned at the suction position 301. In this way the sample information can be read by one reading unit 333 from both the sample container 20 containing the normal sample positioned at the suction position 301 and the sample container 20 containing the priority sample delivered through different paths.

Note that the reading unit 333 may be an antenna for reading an RFID. In this case, the identification member 101 attached to the sample rack 10 and the identification member 201 attached to the sample container 20 are RFID tags.

The pressing member 334 is provided above the sample container 20 positioned at the suction position 301. The cleaning unit 335 is installed on the lower surface of the pressing member 334 above the sample container 20 positioned at the suction position 301. The cleaning unit 335 cleans the outer surface of the suction unit 411 extracted from the sample container 20. The pressing member 334 and the cleaning unit 335 will be described later with reference to FIG. 8.

The sample rack 10 is transported in the X-axis direction so that the plurality of sample containers 20 being held are sequentially positioned at the suction position 301. When the suction of all the sample containers 20 is completed, the sample rack 10 is positioned at the end on the X-axis positive side of the transport path 42a. Then, the pushing member 336 pushes the side surface on the Y-axis positive side of the sample rack 10 in the Y-axis negative direction, and the sample rack 10 is fed onto the bottom surface 43a of the rack collection unit 43. In this way the sample rack 10 is collected by the rack collection unit 43.

The shield member 340 is installed to cover the rack transport unit 42 on the Y-axis negative side near the center position of the rack transport unit 42 in the X-axis direction. An opening 341 is provided in the shield member 340 at a position on the Y-axis negative side of the suction position 301. The sample transport unit 310 is installed inside the opening 341. The cover 350 is provided at the opening 341 and covers the sample transport unit 310. More specifically, the cover 350 switches between opening the inside of the opening 341 to the outside and shielding the opening from the outside. It is possible to prevent the operator from accidentally touching the sample transport unit 310 in operation by providing the cover 350.

The notification unit 360 is configured by an indicator provided on the outer surface of the shield member 340. The notification unit 360 indicates that the sample transport unit 310 is in operation. Specifically, the notification unit 360 flashes during the operation of the sample transport unit 310, and lights continuously while the sample transport unit 310 is not in operation. In this way the operator can determine whether the sample transport unit 310 is in operation with reference to the notification unit 360.

Note that the notification unit 360 is not limited to an indicator, and may be configured by a liquid crystal panel or the like. When the notification unit 360 is configured by a liquid crystal panel, characters such as "the sample transport unit for transporting a priority sample is in operation" are displayed on the notification unit 360 while the sample transport unit 310 is operating.

Figure 5B:
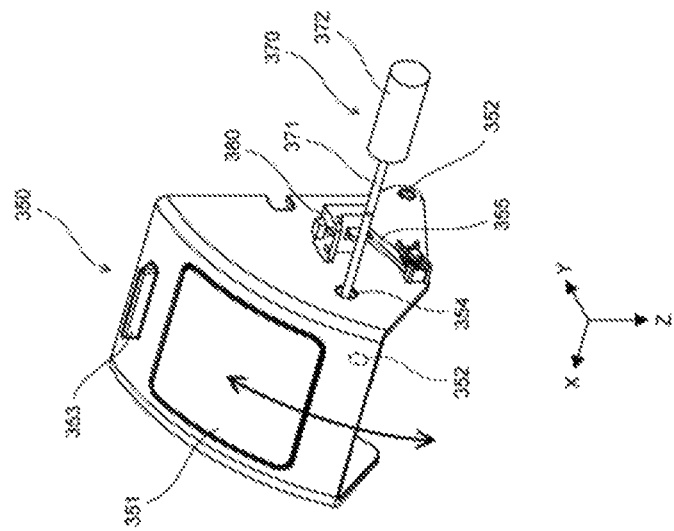
FIG. 5B is a perspective view showing the configuration of the cover, the lock mechanism, and the detection unit according to the first embodiment.
Figure 5A:
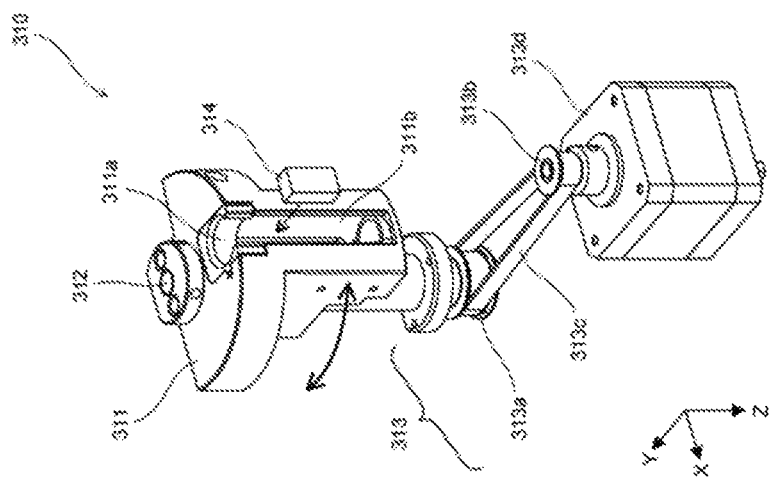
FIG. 5A is a perspective view showing the configuration of a sample transport unit according to the first embodiment.

As shown in FIG. 5A, the sample transport unit 310 includes a holding member 311, a rotation shaft 312, a rotation drive unit 313, and a detection unit 314.

A container holding part 311a extending in the Z-axis direction is formed on the holding member 311. The holding member 311 is fixed to a rotation shaft 312 extending in the Z-axis direction. An opening 311b is formed on the side of the container holding part 311a opposite to the rotation shaft 312.

The rotation drive unit 313 includes pulleys 313a and 313b, a belt 313c, and a motor 313d. The pulley 313a is connected to the lower end of the rotation shaft 312. The belt 313c is looped around pulleys 313a and 313b. The pulley 313b is connected to the rotation shaft of the motor 313d. By driving the motor 313d, the rotation shaft 312 is rotated via the belt 313c. The sample transport unit 310 positions the sample container 20 held by the container holding part 311a at the suction position 301 by rotating the holding member 311 around the rotation shaft 312, and the sample container 20 set in the container holding part 311a of the holding member 311 is positioned at the suction position 301.

When the rotation drive unit 313 rotates the holding member 311 around the rotation shaft 312, the sample transport unit 310 smoothly moves the sample container 20 installed on the holding member 311 from the outside of the transport path 42a to the suction position 301 in the transport path 42a.

The detection unit 314 is a reflection type sensor, and is fixed in the transport unit 31. When the container holding part 311a of the holding member 311 is positioned on the Y-axis negative side as shown in FIG. 5A, the detection unit 314 detects that the sample container 20 is held in the container holding part 311a via the opening 311b.

As shown in FIG. 5B, the cover 350 includes a transparent member 351, a hole 352, a flange 353, a hole 354, and a shielding member 355. The transport unit 31 also includes a lock mechanism 370 and a detection unit 380 near the cover 350.

The transparent member 351 is provided on the front surface of the cover 350, that is, the surface on the Y-axis negative side. The transparent member 351 is provided on the front surface of the cover 350 so that the position of the sample container 20 installed in the sample transport unit 310 can be seen therethrough. In this way the operator can visually determine whether the sample container 20 is installed in the sample transport unit 310 even when the cover 350 is closed.

The holes 352 are provided one each in two planes parallel to the YZ plane of the cover 350. The two holes 352 face each other in the X-axis direction. The cover 350 can rotate around the X-axis via a rotation shaft (not shown) passing through the two holes 352 in the transport unit 31. As the cover 350 rotates around the X-axis, the sample transport unit 310 disposed inside the cover 350 is switched between the state of being opened to the outside and the state of being shielded from the outside. The flange 353 is provided in the vicinity of the upper end of the cover 350. The operator changes the open/close state of the cover 350 by holding the flange 353 and moving the cover 350 along the thick arrow in FIG. 5B.

The shaft 371 of the lock mechanism 370 is attached to and detached from the hole 354. The lock mechanism 370 includes a shaft 371 and a cylinder 372. The shaft 371 moves in the X-axis direction by driving the cylinder 372. The cover 350 cannot rotate around the X-axis, and the cover 350 is locked by inserting the shaft 371 into the hole 354. The removal of the shaft 371 from the hole 354 allows the cover 350 to rotate about the X-axis. During operation of the sample transport unit 310, the cover 350 is locked. The lock mechanism 370 can prevent the operator from accidentally opening the cover 350 and touching the sample transport unit 310 while in operation.

The shield member 355 is disposed on the X-axis negative side of the cover 350. The detection unit 380 is a transmission sensor, and includes a light emitting unit and a light receiving unit. When the cover 350 is closed as shown in FIG. 5B, the shield member 355 is positioned between the light emitting unit and the light receiving unit of the detection unit 380. When the cover 350 rotates around the X-axis, the shield member 355 is retracted from between the light emitting unit and the light receiving unit of the detection unit 380. In this way the open/close state of the cover 350 can be detected by to the detection unit 380.

Figure 6:
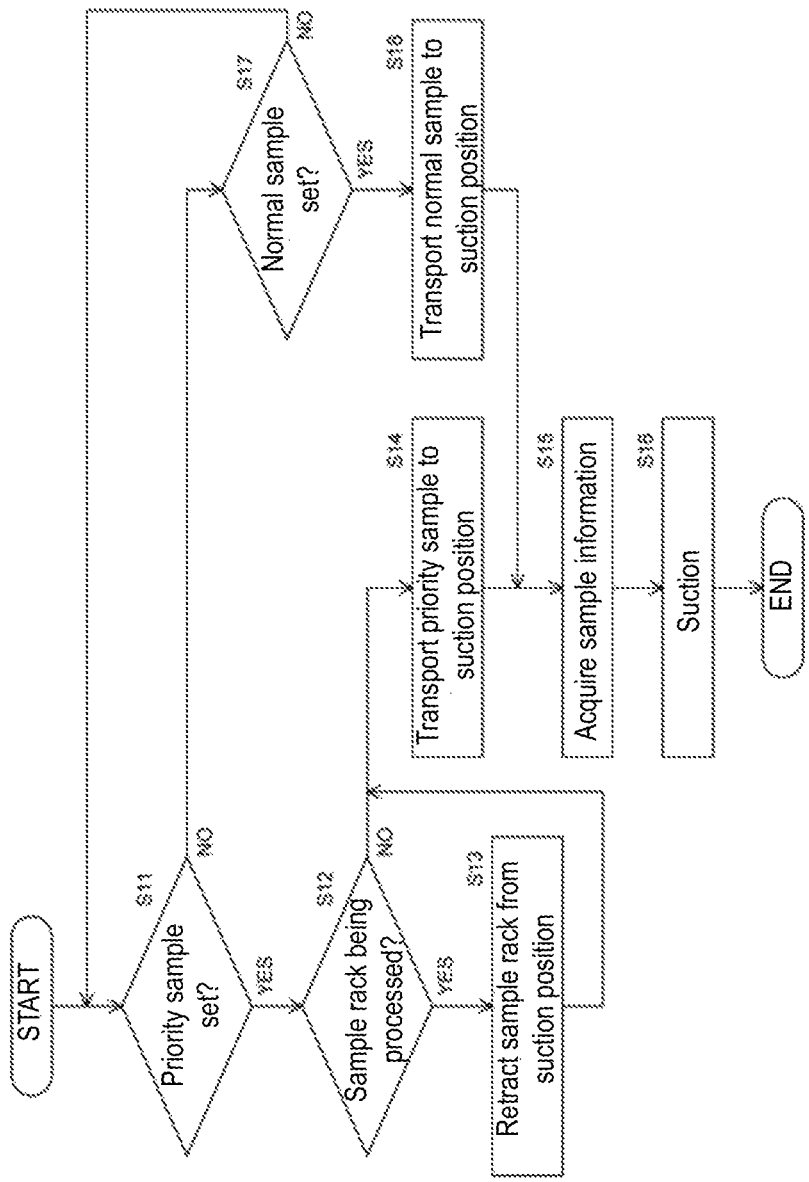
FIG. 6 is a flowchart showing transport control of a priority sample and a normal sample by the transport unit according to the first embodiment.

FIG. 6 is a flowchart showing the transport control of a priority sample and a normal sample by the transport unit 31. The transport control shown in FIG. 6 is performed by a control unit 32a of a measurement unit 32 described later. Note that the transport control also may be performed by the control unit 33a of the analysis unit 33 described later, or may be performed by an external device other than the sample analyzer 30. When a control unit is provided in the transport unit 31, the control unit of the transport unit 31 may perform transport control.

In step S11, the control unit 32a determines whether the sample container 20 accommodating the unsuctioned priority sample is set in the container holding part 311a of the sample transport unit 310, and the cover 350 is closed. The control unit 32a determines whether the sample container 20 is set in the container holding part 311a based on the output signal of the detection unit 314, and determines whether the cover 350 is closed based on the output signal of the detection unit 380. Note that the operator sets the measurement order of the priority sample in advance via the input unit 33d of the analysis unit 33 described later before setting the sample container 20 in the sample transport unit 310.

When the sample container 20 containing the unsuctioned priority sample is set in the sample transport unit 310 and the cover 350 is closed, the controller 32a determines whether the sample rack 10 being processed is present at the suction position 301 in step S12. The state in which the sample rack 10 is being processed at the suction position 301 is a state in which a part of the sample rack 10 overlaps the lower side of the suction position 301, that is, an unsuctioned sample container 20 remains in the sample rack 10. When the sample rack 10 being processed is present at the suction position 301, in step S13, the control unit 32a drives the rack transport unit 42 to move the sample rack 10 in the negative direction of the X-axis to retract the sample rack 10 from the suction position 301. When there is no sample rack 10 being processed at the suction position 301, the process of step S13 is skipped.

In step S14, the control unit 32a drives the sample transport unit 310 to rotate the holding member 311 around the rotation shaft 312, and transports the sample container 20 containing the priority sample to the suction position 301. In step S15, the control unit 32a positions the reading unit 333 behind the suction position 301, and reads the barcode from the identification member 201 of the sample container 20 containing the priority sample positioned at the suction position 301. In step S16, the control unit 32a drives the sample dispensing unit 410 to suction the priority sample from the sample container 20 positioned at the suction position 301 via the suction unit 411.

Then, the control unit 32a rotates the holding member 311 around the rotation shaft 312, and positions the holding member 311 at a position for installing the sample container 20 as shown in FIG. 4. The position of the holding member 311 shown in FIG. 4 is a position at which the sample container 20 is installed in the sample transport unit 310. The operator opens the cover 350 and removes the sample container 20 for which suction has been completed from the holding member 311. When the suction of the priority sample is completed, the temporarily retract sample rack 10 is again transported to the suction position 301 in step S18 described later, and a normal sample is suctioned from the sample container 20 held by the sample rack.

If it is determined in step S11 that a priority sample is not set or the cover 350 is not closed, the control unit 32a determines whether there is a normal sample to be analyzed in step S17. The state in which a normal sample to be analyzed is present includes the state in which the sample rack 10 is set in the rack storage unit 41, and the state in which an unsuctioned sample container 20 is present in the sample rack 10 of the rack transport unit 42. If there is no normal sample to be analyzed, the process returns to step S11. When there is a normal sample to be analyzed, in step S18, the control unit 32a drives the rack storage unit 41 and the rack transport unit 42 to transport the sample rack 10, and moves the sample container 20 accommodating the normal sample held in the sample rack 10 to the suction position 301.

Thereafter, the control unit 32a performs the processes of steps S15 and S16 as in the case of the priority sample. That is, in step S15, the control unit 32a positions the reading unit 333 behind the suction position 301 and reads the barcode from the identification member 201 of the sample container 20 containing the normal sample positioned at the suction position 301. In step S16, the control unit 32a drives the sample dispensing unit 410 to suction the normal sample from the sample container 20 positioned at the suction position 301 via the suction unit 411.

Thus, when the process ends, the process is started again from step S11, and the transport control of FIG. 6 is repeatedly performed.

As described above, the sample container 20 held by the holding member 311 is transported to the suction position 301 based on the detection of the sample container 20 held by the holding member 311. In this way analysis of the priority sample can be smoothly started by setting the sample container 20 containing the priority sample in the holding member 311.

When analyzing a priority sample, the priority sample is moved to the suction position 301 by the sample transport unit 310 after the sample rack 10 positioned at the suction position 301 is temporarily retracted from the suction position 301 by the rack transport unit 42. In this way the priority sample can be suctioned prior to the suction of the normal sample.

Figure 7:
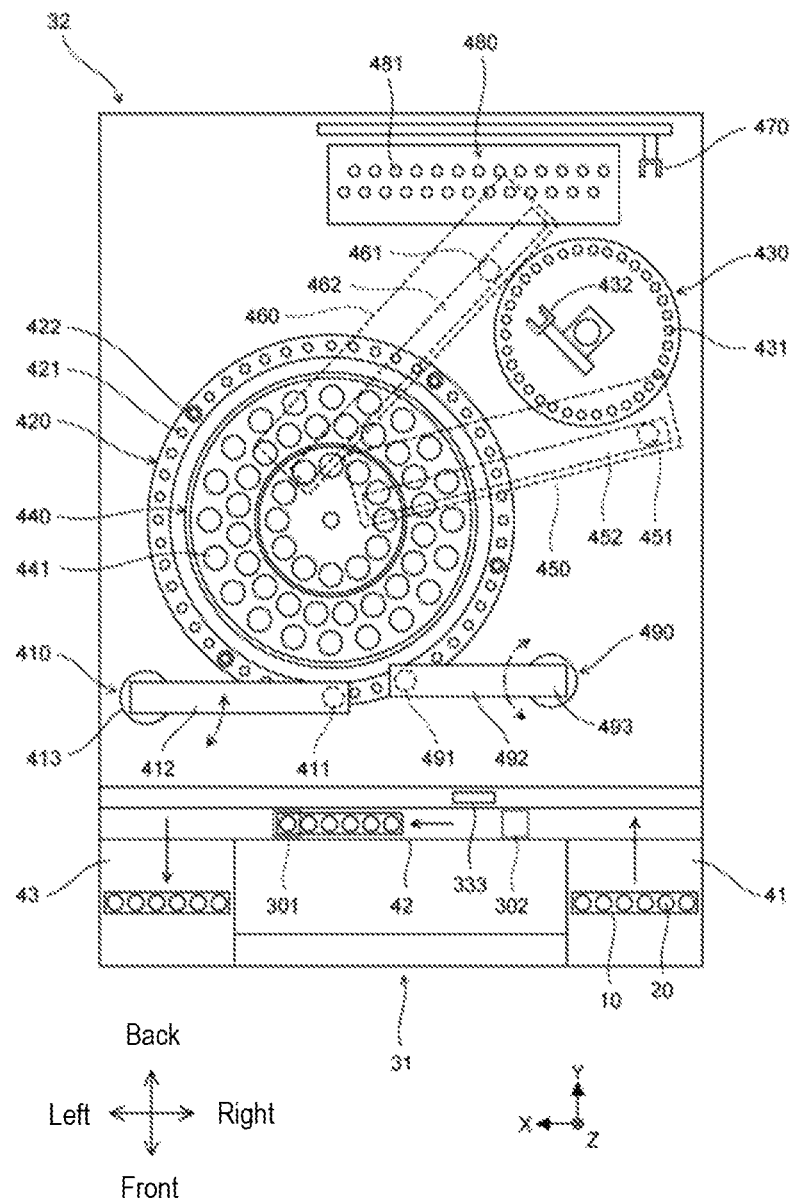
FIG. 7 is a plan view schematically showing the configuration when the transport unit and the measurement unit according to the first embodiment are viewed from above.

As shown in FIG. 7, the measurement unit 32 is disposed behind the transport unit 31. The measurement unit 32 performs measurement regarding a blood coagulation test. Therefore, in the first embodiment, the sample contained in the sample container 20 is plasma.

Note that the liquid stored as the sample in the sample container 20 is not limited to plasma. That is, the sample stored in the sample container 20 is not limited to plasma, and may be whole blood, serum, urine, lymph fluid, body cavity fluid, or the like. For example, when the measurement unit 32 performs measurement related to blood tests on the sample, the sample may be whole blood. For example, when the measurement unit 32 performs measurement of a sample, such as a coagulation test, immunoassay test, or biochemical test, the sample may be plasma. For example, when the measurement unit 32 performs measurement on sample, such as an immunological test or a biochemical test, the sample may be serum.

The measurement unit 32 includes a sample dispensing unit 410, a reaction container table 420, a heating table 430, a reagent table 440, reagent dispensing units 450 and 460, a transport unit 470, a detection unit 480, and a dispensing unit 490.

The sample dispensing unit 410 lowers the suction unit 411 from the upper side of the sample container 20 positioned at the suction position 301 to penetrate the stopper 210. Then, the sample dispensing unit 410 suctions the sample from the sample container 20 via the suction unit 411, and discharges the suctioned sample to the reaction container 422 held by the holding hole 421 of the reaction container table 420.

Similar to the sample dispensing unit 410, the sample dispensing unit 490 includes a suction unit 491, an arm 492, and a mechanical unit 493. The suction unit 491 is installed at the tip of the arm 492. The suction unit 491 is configured by a nozzle. The sample dispensing unit 490 is used to suction a small amount of sample from the sample container 20 in which the opening 221 is opened, so the tip of the suction unit 411 has a flat shape. The mechanical unit 493 is configured to rotate the arm 492 in the circumferential direction and to move the arm 492 in the vertical direction. In this way the suction unit 491 can move in the circumferential direction and in the vertical direction.

The sample dispensing unit 490 inserts the suction unit 491 into the sample container 20 by lowering the suction unit 491 from above relative to the sample container 20 positioned at the suction position 302 on the transport path 42a of the rack transport unit 42. Then, the sample dispensing unit 490 suctions the sample from the sample container 20 via the suction unit 491 and discharges the suctioned sample to the reaction container 422 held in the holding hole 421 of the reaction container table 420.

The reaction container table 420 has an annular shape in plan view, and is disposed outside the reagent table 440. The reaction container table 420 is configured to be rotatable in the circumferential direction. The reaction container table 420 has a plurality of holding holes 421 for holding the reaction container 422.

The heating table 430 includes a plurality of holding holes 431 for holding the reaction container 422, and a transport unit 432 for transporting the reaction container 422. The heating table 430 has a circular outline in plan view, and is configured to be rotatable in the circumferential direction. The heating table 430 heats the reaction container 422 set in the holding hole 431 to 37° C.

When a sample is discharged to the reaction container 422 held on the reaction container table 420, the reaction container table 420 is rotated, and the reaction container 422 containing the sample is transported to the vicinity of the heating table 430. Then, the transport unit 432 of the heating table 430 holds the reaction container 422 and sets it in the holding hole 431 of the heating table 430.

The reagent table 440 is configured to accommodate a plurality of reagent containers 441 containing reagents used for measurement related to a blood coagulation test. The reagent table 440 is configured to be rotatable in the circumferential direction. A plurality of reagent containers 441 containing reagents used in measurement of measurement items are installed on the reagent table 440.

The reagent dispensing unit 450 includes a nozzle 451 and a mechanical unit 452. The mechanical unit 452 is configured to move the nozzle 451 in the horizontal direction so as to transect the reagent table 440, and to move the nozzle 451 in the vertical direction. Similarly, the reagent dispensing unit 460 includes a nozzle 461 and a mechanical unit 462. The mechanical unit 462 is configured to move the nozzle 461 in the horizontal direction so as to transect the reagent table 440, and to move the nozzle 461 in the vertical direction. The reagent dispensing units 450 and 460 are installed below the upper surface of the measurement unit 32.

The reagent dispensing units 450 and 460 dispense the reagent into the reaction container 422 heated by the heating table 430. When dispensing the reagent, the transport unit 432 or the transport unit 470 removes the reaction container 422 from the holding hole 431 of the heating table 430, and positions the reaction container 422 at a predetermined position near the heating table 430. Then, the reagent dispensing unit 450, 460 suctions the reagent from the reagent container 441 through the nozzles 451, 461, and discharges the suctioned reagent to the reaction container 422. In this way the reagent is mixed with the sample to prepare a measurement sample. Thereafter, the transport unit 470 sets the reaction container 422 in the holding hole 481 of the detection unit 480.

The measurement principle of the detection unit 480 is, for example, a coagulation method, a synthetic substrate method, an immunoturbidimetric method, an agglutination method, or the like. The detection unit 480 includes a plurality of holding holes 481. The detection unit 480 irradiates light on the reaction container 422 set in the holding hole 481, receives the light transmitted through the measurement sample, and outputs a signal according to the intensity of the received light. The control unit 32a of the measurement unit 32 stores the signal output from the detection unit 480 as a measurement result, and transmits the measurement result to the analysis unit 33.

Figure 8:
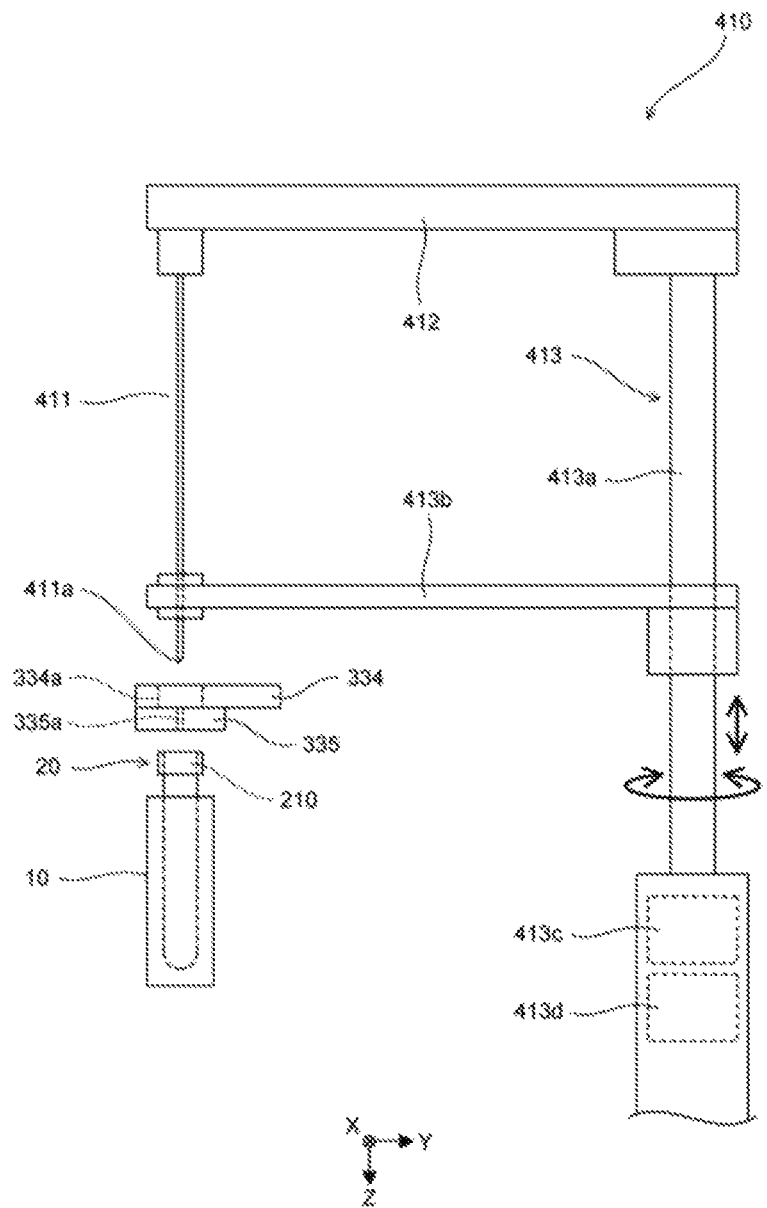
FIG. 8 is a side view schematically showing the configuration of a sample dispensing unit, a pressing member, and a washing unit according to the first embodiment.

As shown in FIG. 8, the sample dispensing unit 410 includes a suction unit 411, an arm 412, and a mechanical unit 413. The mechanical unit 413 includes a shaft 413a, a guide member 413b, and driving units 413c and 413d. In addition to the sample dispensing unit 410, FIG. 8 also illustrates the sample container 20 positioned at the suction position 301, the sample rack 10 holding the sample container 20, the pressing member 334 provided immediately above the suction position 301, and the cleaning unit 335. The suction unit 411 is a nozzle in which the tip 411a on the Z-axis positive side is pointed.

The drive unit 413c moves the shaft 413a in the Z-axis direction. The drive unit 413d rotates the shaft 413a with the Z-axis as the center of rotation. The drive units 413c and 413d are configured by stepping motors. The shaft 413a supports the arm 412. The suction unit 411 is installed downward at the end of the arm 412. The guide member 413b is rotatable in accordance with the rotation of the shaft 413a, and is installed relative to the shaft 413a so that the position in the Z-axis direction does not change. A hole penetrating in the vertical direction is formed at the tip of the guide member 413b, and the suction unit 411 passes through the hole at the tip of the guide member 413b.

The pressing member 334 is attached to the transport unit 31. A hole 334a which penetrates the pressing member 334 in the vertical direction is formed in the pressing member 334. The cleaning unit 335 is installed on the lower surface of the pressing member 334. A hole 335a penetrating the cleaning unit 335 in the vertical direction is formed in the cleaning unit 335. Two flow paths (not shown) extending horizontally also are formed in the hole 335a. When the suction unit 411 is extracted from the sample container 20, the cleaning part 335 causes a cleaning liquid to flow in one of the flow paths connected in the horizontal direction to the hole 335a and discharges the cleaning liquid from the other flow path. In this way the outer surface of the suction unit 411 passing through the hole 335a is cleaned, so that contamination of the sample can be prevented.

The pressing member 334 is provided above the sample container 20 positioned at the suction position 301. In this way, even when the sample container 20 moves upward in conjunction with the movement of the suction unit 411 when the suction unit 411 which has penetrated the stopper 210 is extracted from the sample container 20, the top end of the sample container 20 is pressed by the pressing member 334 through the cleaning unit 335. In this way it is possible to prevent the sample container 20 from moving upward with the movement of the suction unit 411 and being removed from the sample rack 10 or the sample transport unit 310.

Figure 9:
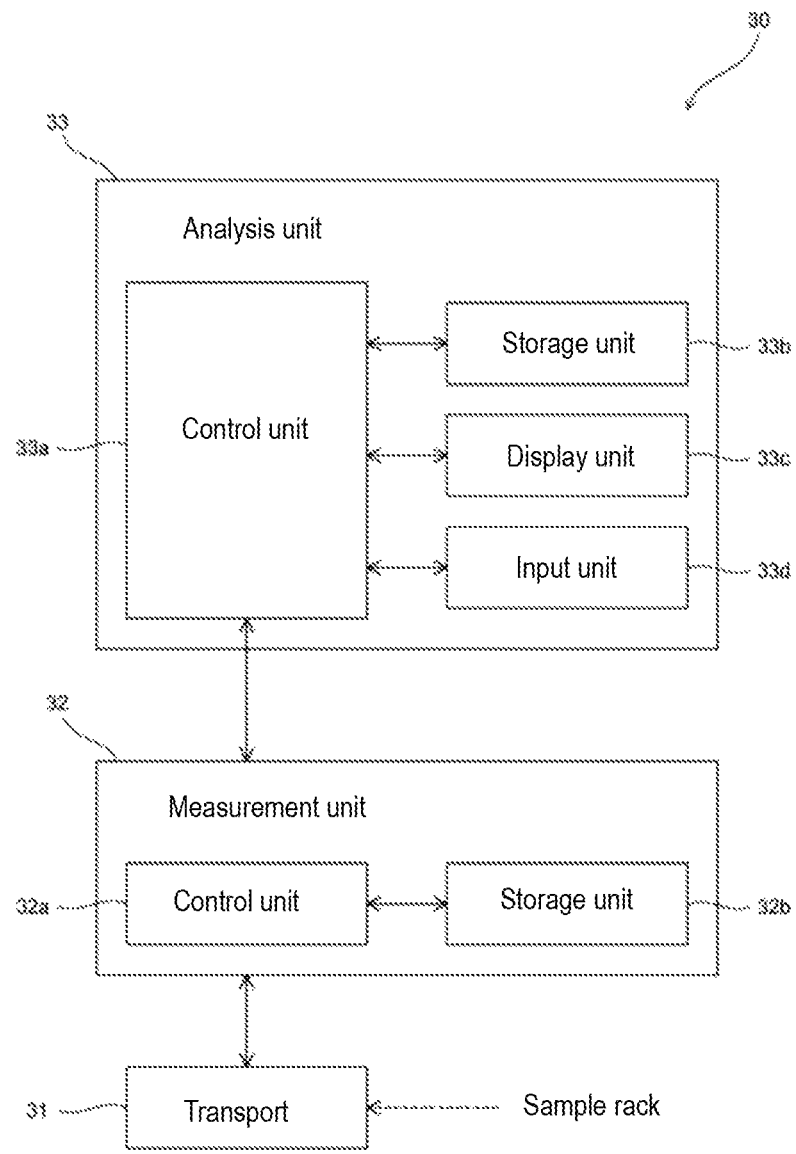
FIG. 9 is a block diagram showing the configuration of the sample analyzer according to the first embodiment.
Figure 12:
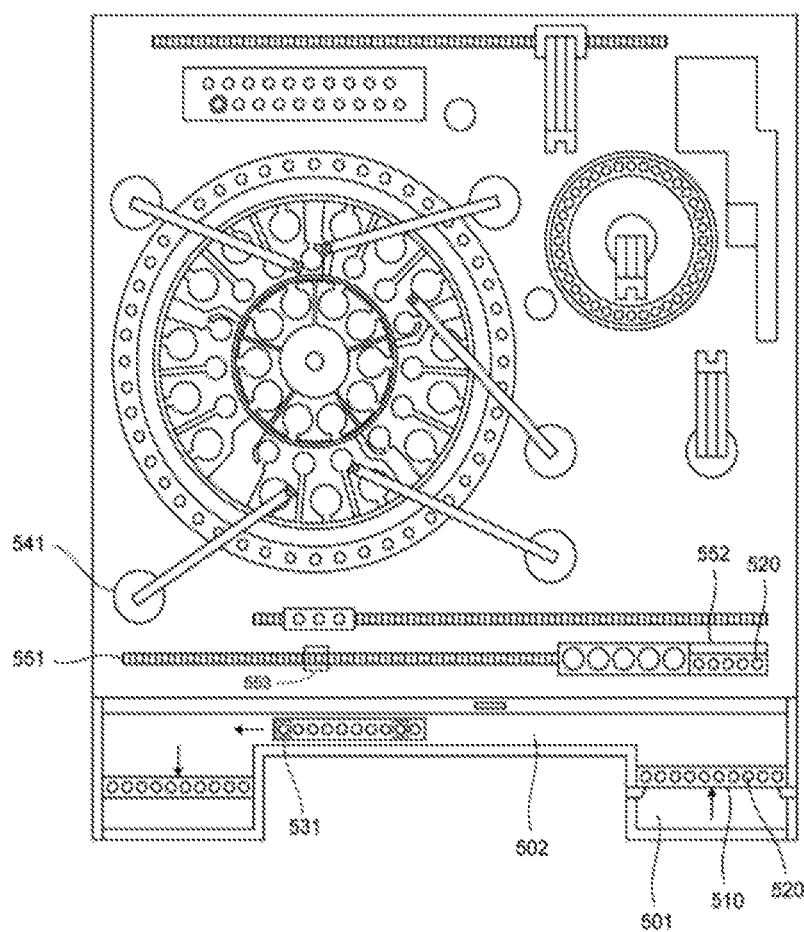
FIG. 12 is a schematic view describing the configuration according to the related art.

As shown in FIG. 9, the sample analyzer 30 includes a transport unit 31, a measurement unit 32, and an analysis unit 33.

The measurement unit 32 includes a control unit 32a, a storage unit 32b, and various mechanical units illustrated in FIGS. 7 and 8. Control unit 32a is, for example, a CPU. The storage unit 32b is, for example, a ROM, a RAM, and a hard disk. The control unit 32a controls each part in the measurement unit 32 and the transport unit 31 in accordance with a program and data stored in the storage unit 32b. The control unit 32a suctions the sample supplied by the transport unit 31, performs measurements related to the blood coagulation test for the sample, and transmits the measurement results to the analysis unit 33.

The analysis unit 33 includes a control unit 33a, a storage unit 33b, a display unit 33c, and an input unit 33d. Control unit 33a is, for example, a CPU. The storage unit 33b is, for example, a ROM, a RAM, a hard disk. The control unit 33a controls each unit in the analysis unit 33 and the measurement unit 32 according to a program or data stored in the storage unit 33b. The display unit 33c is, for example, a liquid crystal display. The input unit 33d is, for example, a mouse or a keyboard. The display unit 33c and the input unit 33d may be integrally configured by a touch panel display or the like.

The control unit 33a analyzes the blood coagulation test of a sample based on the measurement result received from the measurement unit 32. Specifically, the control unit 33a analyzes measurement items including PT, APTT, Fbg, extrinsic coagulation factor, intrinsic coagulation factor, coagulation factor XIII, HpT, TTO, FDP, D dimer, PIC, FM, ATIII, Plg, APL, PC, VWF: Ag, VWF: RCo, ADP, collagen, epinephrine.

Second Embodiment

In the second embodiment shown in FIG. 10, the sample transport unit 310 also is provided at a suction position 302 at which the sample dispensing unit 490 of the measurement unit 32 suctions a sample from the transport path 42a, similarly to the suction position 301. In this way, in the second embodiment, the shield member 340 extends to the X-axis negative side so as to protect the suction position 302 as compared with the first embodiment, and the cover 350 also is provided on the Y-axis negative side. In the second embodiment, the pressing member 334 also extends in the X-axis direction so as to straddle above the suction positions 301 and 302. A cleaning unit 335 is provided on the lower surface of the pressing member 334 immediately above the suction position 302.

In the second embodiment, a sample dispensing unit 410 also is disposed at the position of the sample dispensing unit 490 rather than the sample dispensing unit 490. That is, the measurement unit 32 according to the second embodiment includes two sample dispensing units 410 including the suction unit 411 which has a sharp tip 411a. In this way the sample dispensing unit 410 on the X-axis negative side can suction the sample from the inside of the sample container 20 by making the suction unit 411 penetrate the stopper 210 of the sample container 20 situated at the suction position 302. Other structures of the second embodiment are the same as those of the first embodiment.

In the second embodiment, the sample can be suctioned from the sample container 20 containing the normal sample and the sample container 20 containing the priority sample via the stopper 210 at the suction position 302, similarly to the suction position 301. Hence, multiple priority samples can be analyzed quickly. In the second embodiment, the reading unit 333 also is movable in the X-axis direction to the positions of the suction positions 301 and 302. In this way the barcode can be read by one reading unit 333 at the suction positions 301 and 302 from both the sample container 20 containing the normal sample and the sample container 20 containing the priority sample.

Third Embodiment

As shown in FIG. 11A, in the third embodiment, three container holding parts 311a are provided on the holding member 311 of the sample transport unit 310. All three container holding parts 311a are arranged on the circumference centering on the rotation shaft 312. Other structures of the third embodiment are the same as those of the first embodiment.

As described above, when a plurality of container holding parts 311a are formed on the holding member 311, the operator sets the plurality of sample containers 20 containing the priority samples in the holding member 311 to continuously analyze the plurality of priority samples. Note that the number of objects of the container holding part 311a provided in the holding member 311 is not limited to three, and may be another number.

Fourth Embodiment

In the fourth embodiment shown in FIG. 11B, the holding member 311 of the sample transport unit 310 has an elliptical shape in plan view. Other structures of the fourth embodiment are the same as those of the first embodiment.

According to the fourth embodiment, the shape of the holding member 311 in plan view is a convex shape centered on the rotation shaft 312, and includes a curve. In this way, the planar area required for the rotation of the holding member 311 can be reduced as in the first embodiment.

What is claimed is:
1. A sample analyzer comprising:
a suction unit comprising a suction nozzle configured to suction a sample in a sample container through a stopper installed in an opening of the sample container;
a rack transport unit configured to transport a sample rack holding a plurality of first sample containers along a transport path, and sequentially position the first sample containers, while held in the sample rack, at a suction position provided on the transport path where the suction nozzle is located;

a sample transport unit in which a second sample container other than the first sample containers transported by the rack transport unit is received, the sample transport unit configured to transport the second sample container in a horizontal direction from a sample receiving position to the suction position provided on the transport path, wherein the sample transport unit comprises a holding member configured to hold the second sample container;

a measurement unit configured to measure a sample suctioned by the suction nozzle from one of the first sample containers positioned at the suction position or the second sample container positioned at the suction position;

an analysis computer configured to analyze the sample based on a measurement result of the measurement unit; and a controller configured to control the suction unit to suction the sample in the one of the first sample containers held by the sample rack at the suction position, the controller further configured to drive the rack transport unit to retract the sample rack out of the suction position provided on the transport path and drive the sample transport unit to move the second sample container from the sample receiving position to the suction position provided on the transport path where the sample rack was previously positioned, and to control the suction unit to suction the sample in the second sample container at the suction position.

2. The sample analyzer according to claim 1, further comprising
a pressing member provided above the first sample containers or the second sample container positioned at the suction position, the pressing member fixedly positioned to restrict upward movement of the first sample containers or the second sample container.

3. The sample analyzer according to claim 2, further comprising
a cleaning unit comprising a hole and a cleaning liquid flow path, the suction nozzle extendible through the hole into the first sample containers or the second sample container, and the cleaning liquid flow path in liquid communication with the hole such that discharge of cleaning fluid from the cleaning fluid flow path decontaminates an outer surface of the suction nozzle in the hole, the cleaning unit disposed between the pressing member and the first sample containers or the second sample container.

4. The sample analyzer according to claim 1, wherein
the sample transport unit comprises a rotation drive unit configured to rotate the holding member in the horizontal direction to transport the second sample container from a sample receiving position in which the holding member receives the sample to the suction position.

5. The sample analyzer according to claim 4, wherein
the sample transport unit comprises a rotation shaft configured to rotate the holding member to the suction position on the transport path.

6. The sample analyzer according to claim 5, wherein
a shape of the holding member in a plan view includes an arc centered on the rotation shaft.

7. The sample analyzer according to claim 1, wherein
a plurality of container holding parts, each configured to hold the second sample container, are formed on the holding member.

8. The sample analyzer according to claim 4, wherein
the sample transport unit includes a detector that detects that the second sample container is held by the holding member in the sample receiving position.

9. The sample analyzer according to claim 8, wherein
the detector is coupled with the sample transport unit such that the sample transport unit transports the second sample container held by the holding member from the sample receiving position to the suction position in response to a detection by the detector of insertion of the second sample container into the holding member.

10. The sample analyzer according to claim 1, further comprising
a cover that covers the sample transport unit when in a closed position, the sample transport unit being enabled to transport the second sample container from the sample receiving position to the suction position in response to the cover being in the closed position.

11. The sample analyzer according to claim 10, further comprising
a lock mechanism that locks the cover.

12. The sample analyzer according to claim 10, wherein
the cover includes a transparent member through which a position of the second sample container installed in the sample transport unit is visible.

13. The sample analyzer according to claim 1, further comprising
a notification unit that notifies that the sample transport unit is in operation.

14. The sample analyzer according to claim 1, wherein
the suction nozzle comprises a nozzle having a pointed tip.

15. The sample analyzer according to claim 1, wherein
the rack transport unit transports the sample rack holding the first sample containers each containing a normal sample along the transport path, and positions the first sample containers held by the sample rack at the suction position; and
the second sample container containing a priority sample requiring analysis prior to the normal sample is sensed as being installed in the sample transport unit, and the sample transport unit transports the second sample container to the suction position.

16. The sample analyzer according to claim 15 wherein
when analyzing the priority sample, the sample transport unit transports the priority sample to the suction position after the sample rack positioned at the suction position is retracted from the suction position by the rack transport unit.

17. The sample analyzer according to claim 1, further comprising:
a reading unit that reads sample information from each of the first sample containers or the second sample container positioned at the suction position.

18. A sample analyzing method, comprising:
receiving a first sample container containing a priority sample in a sample transport unit positioned at a sample receiving position after a sample rack holding a plurality of sample containers, other than the first sample container, has been transported by a rack transport unit along a transport path and one of the sample containers is presently positioned in a suction position provided on the transport path where a suction nozzle is located, wherein each sample container of the plurality of sample containers contains a normal sample;

retracting the sample rack such that the one of the sample containers containing the normal sample is retracted from the suction position to make the suction position available, and transporting the first sample container containing the priority sample in a horizontal direction from the sample receiving position to said suction position provided on the transport path;

penetrating, with the suction nozzle, a stopper installed in an opening of the first sample container positioned at the suction position nozzle to suction the priority sample;

measuring the priority sample suctioned from the first sample container positioned at the suction position; and analyzing the priority sample based on a measurement result of the priority sample.

19. The sample analyzing method according to claim 18, wherein a holding member of the sample transport unit holding the first sample container containing the priority sample is rotated in the horizontal direction to transport the first sample container containing the priority sample to the suction position provided on the transport path.

20. A sample analyzer comprising:

a suction unit comprising a suction nozzle configured to suction a sample in a sample container;

a rack transport unit configured to transport a sample rack holding a plurality of first sample containers along a transport path, and sequentially position the first sample containers, while being held in the sample rack, at a suction position on the transport path where the suction nozzle is positioned;

a sample transport unit comprising a holding member configured to hold a second sample container other than the sample container transported by the rack transport unit, and a rotation drive configured to rotate the holding member, in a horizontal direction, from a sample receiving position to the suction position on the transport path;

a measurement unit configured to measure the sample suctioned by the suction nozzle from the first sample containers or the second sample container positioned at the suction position; and an analysis computer configured to analyze the sample based on the measurement result of the measurement unit, wherein a transport route of the sample container by the rack transport unit and a transport route of the sample container by rotational operation of the rotation drive intersecting at the suction position on the transport path, the rack transport unit further configured to movably position the sample rack out of the suction position in response to the second sample container being placed in the holding member, and the holding member is arranged to hold the second sample container at a position away from the transport path, and the second sample container held by the holding member is horizontally transportable to the suction position on the transport path where the sample rack was previously positioned from the position away from the transport path after the rack transport unit has moved the sample rack out of the suction position.

\* \* \* \* \*

UNITED STATES PATENT AND TRADEMARK OFFICE
CERTIFICATE OF CORRECTION

PATENT NO.       : 11,680,951 B2                              Page 1 of 1
APPLICATION NO.  : 16/553905
DATED            : June 20, 2023
INVENTOR(S)      : Oda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this
First Day of July, 2025

Coke Morgan Stewart
*Acting Director of the United States Patent and Trademark Office*